Feb. 16, 1960

O. J. VOSS ET AL 2,925,293

V-BELT DRIVE SYSTEM

Filed April 7, 1958

INVENTORS:
OTTO J. VOSS
LOREN WILLHOFT

By Bruninga and Sutherland,
ATTORNEYS.

2,925,293
V-BELT DRIVE SYSTEM

Otto J. Voss, Town and Country, and Loren Willhoft, Frontenac, Mo.

Application April 7, 1958, Serial No. 726,696

1 Claim. (Cl. 287—53)

This invention relates to V-belt drives, and more particularly to a system of locking a narrow V-belt pulley on its shaft.

It will be understood that V-belt drives are used in great numbers, and in those uses affording the greatest volume market, increasing competitive conditions require a reduction in the cost and size of the V-belt drive. An effective way of achieving lesser costs is to reduce the width of the belt and its associated pulley, but this approach introduces a problem in attaching the narrow pulley to its shaft. The conventional practice has been to provide a flat area or keyway on the shaft and a cooperating set screw on the pulley. While the pulley may be formed with an axially projecting hub for receiving the set screw, it is more economical to eliminate the hub by locating the set screw in the bottom of the V groove. This procedure is not feasible, however, with the narrower V-belt drives now contemplated.

Accordingly, an object of the invention is to provide an improved V-belt drive system wherein a narrow hubless pulley is secured on the shaft of a non-reversing drive, such non-reversing drives constituting the bulk of the market. Among the several other objects of the invention may be noted the provision of a V-belt drive of this type which permits the pulley to be readily attached or removed from the shaft; the provision of a system of attaching the pulley to the shaft which affords considerable savings; and the provision of a system of attaching the drive to the shaft that does not require complicated or bulky tools.

Other features of the invention will be in part apparent from and in part pointed out in the following detailed description taken in connection with the accompanying drawings, in which.

Figure 1:
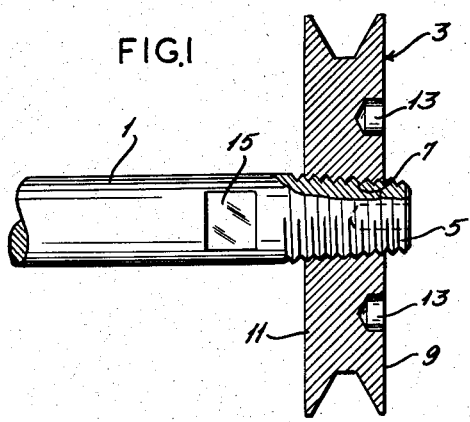
Fig. 1 is a longitudinal section illustrating the inventive feature of a V-belt drive system.
Figure 2:
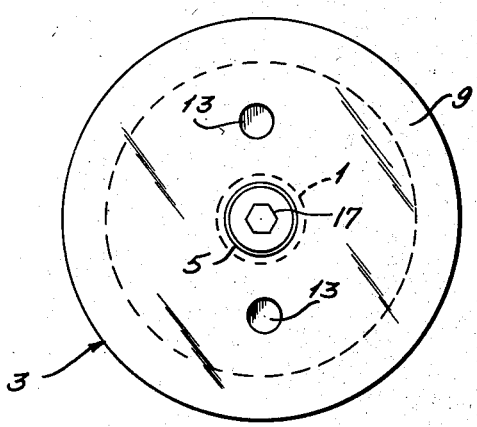
Fig. 2 is a right end view of the device shown in Fig. 1.
Figure 3:
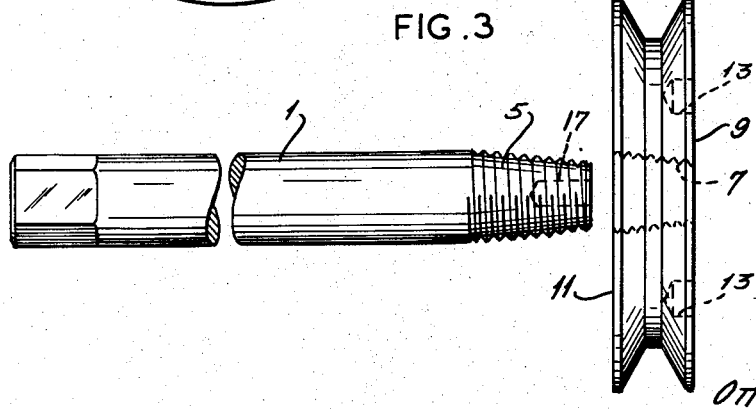
Fig. 3 is an exploded view illustrating the shaft and pulley of this invention.

Referring to the drawings, there is shown a drive system including a shaft 1 and associated drive pulley 3. Necessarily, the pulley should be truly concentric with the shaft or its axis of rotation. Accordingly, the most economical method of mounting a pulley has been to form a center hole for receiving the shaft, the formation and accurate location of such a hole being a relatively simple task. A flattened area or keyway is then formed on the shaft beneath the pulley, and a set screw is tapped or threaded into the pulley for locking engagement with the flattened area or keyway. The pulley might have a hub specially formed for receiving a set screw, or a more economical practice involves omitting the hub and drilling a hole from the bottom of the V of the pulley inwardly so that the set screw is accessible from the periphery of the pulley.

While these systems have proved to be satisfactory, they necessarily are feasible only when the width of the pulley (including hub) is above a predetermined minimum value. For example, the hub must be wide in order to accommodate a set screw of adequate size and strength, or if the screw is located in the pulley, then the width of the pulley must be sufficient to accommodate a set screw of sufficient size.

The present invention contemplates elimination of the set screw and the hub, the pulley instead being secured to the shaft by means of a tapering threaded connection. The taper threads are of the type normally employed in threaded lengths of pipe, hence the equipment for manufacturing the pulley and shaft is readily available, and the manufacturing operations are comparatively inexpensive. In the drawings, the end of the shaft 1 is formed with a short section of taper threads 5, and the taper being toward the end of the shaft. The pulley is formed with a center bore as heretofore, and this bore is then tapped with threads 7, which taper from one side 9 to the other side of the pulley 11. The particular type of taper thread may vary from standard pipe threads, to Acme threads, which latter are adapted to withstand greater forces without breaking the pulley.

In order to facilitate assembly of the pulley with the shaft and provide for a reasonably firm connection, the one side 9 of the pulley is further provided with one or more small cavities 13 for cooperation with a spanner wrench, which are well known in the art hence are not described here. Also, the shaft 1 may be adapted for gripping by means of a wrench to prevent its rotation during assembly with the pulley. For example, portions thereof may be milled flat as indicated at 15, or alternatively, a polygonal socket 17 may be formed at the end of the shaft for cooperation with a socket wrench.

It will be apparent that the above system is adapted for inexpensive machining operations, facilitates assembly and permits substantial reduction in the width of V-belt pulleys.

From the foregoing description, it is apparent that those skilled in the art will understand the structure, function and mode of operation of the invention herein disclosed, and appreciate the advantages thereof. Although one embodiment has been disclosed in detail, it is to be understood that the invention is not limited thereto, but the drawings and description thereof are to be understood as being merely illustrative. It is realized that many modifications and variations will present themselves to those skilled in the art without departing from the spirit of this invention or the scope thereof as set forth in the appended claim.

Having thus described the invention, what is claimed and desired to be secured by Letters Patent is:

In a V-belt drive; the improvement that comprises a V-belt pulley of uniform width and having substantially flat faces, a peripheral V-shaped groove formed in said pulley, said V-shaped groove being of a width to extend substantially across the full width of the pulley at the periphery thereof, thereby providing a pulley of minimum width in relation to the size of the V-belt groove, said pulley being provided with a central tapering shaft-receiving opening having tapering threads extending entirely through the pulley from one face to the other face thereof, and a shaft having a tapering end with tapering threads of a length as great as the width of the pulley, said pulley being fully mounted on said shaft by means of the tapering threaded connections, whereby the pulley is securely locked on the shaft against axial and rotational movement relative to the shaft in one direction of movement, socket means formed on one face of said pulley and means on said shaft to facilitate rotation of the pulley relative to the shaft, thereby to lock and remove the pulley from the shaft.

References Cited in the file of this patent
UNITED STATES PATENTS

| | | |
|---|---|---|
| 131,132 | Sweeney | Sept. 3, 1872 |
| 459,954 | Barrow | Sept. 22, 1891 |
| 1,063,790 | Greaves | June 3, 1913 |
| 1,862,704 | Prouty et al. | June 14, 1932 |
| 2,550,223 | Carlin et al. | Apr. 24, 1951 |
| 2,768,037 | Payne | Oct. 23, 1956 |